US012322533B2

(12) United States Patent
Chen et al.

(10) Patent No.: US 12,322,533 B2
(45) Date of Patent: Jun. 3, 2025

(54) HIGH-STRENGTH R-T-B RARE EARTH PERMANENT MAGNET AND PREPARATION METHOD THEREOF

(71) Applicant: ZHEJIANG INNUOVO MAGNETICS CO., LTD., Dongyang (CN)

(72) Inventors: Biao Chen, Dongyang (CN); Song Fu, Dongyang (CN); Xiaoming Hu, Dongyang (CN); Zhaoneng Zhang, Dongyang (CN); Lixu Wang, Dongyang (CN); Chao Man, Dongyang (CN)

(73) Assignee: ZHEJIANG INNUOVO MAGNETICS CO., LTD., Dongyang (CN)

( * ) Notice: Subject to any disclaimer, the term of this patent is extended or adjusted under 35 U.S.C. 154(b) by 328 days.

(21) Appl. No.: 17/912,481

(22) PCT Filed: Dec. 22, 2021

(86) PCT No.: PCT/CN2021/140334
§ 371 (c)(1),
(2) Date: Sep. 16, 2022

(87) PCT Pub. No.: WO2022/170862
PCT Pub. Date: Aug. 18, 2022

(65) Prior Publication Data
US 2023/0135049 A1    May 4, 2023

(30) Foreign Application Priority Data
Sep. 30, 2021    (CN) .......................... 202111161462.8

(51) Int. Cl.
*H01F 1/057*    (2006.01)
*B22F 3/16*    (2006.01)
(Continued)

(52) U.S. Cl.
CPC .............. *H01F 1/0577* (2013.01); *B22F 3/16* (2013.01); *B22F 9/023* (2013.01); *C22C 38/002* (2013.01);
(Continued)

(58) Field of Classification Search
None
See application file for complete search history.

(56) References Cited

U.S. PATENT DOCUMENTS

2013/0026870 A1*   1/2013   Baba .................... C22C 38/005
                                                        427/127
2016/0225501 A1*   8/2016   Miwa ................... H01F 1/0577

FOREIGN PATENT DOCUMENTS

WO    WO-2004030000 A1 *   4/2004    ............... B22F 3/02
WO    WO-2011122638 A1 *   10/2011   ............... C21D 6/00

* cited by examiner

Primary Examiner — Xiaobei Wang
(74) Attorney, Agent, or Firm — Jiwen Chen; Joywin IP Law PLLC (57) ABSTRACT

The present invention discloses a high-strength R-T-B rare earth permanent magnet and a preparation method thereof. The magnet contains 0.3-1.5 wt. % of an element Zr, and a cast strip prepared through vacuum induction melting and melt spinning is treated at a high temperature to make the element Zr therein precipitate in a form of fibrous Zr compounds from R-rich phases, and the fibrous Zr compounds can be uniformly mixed with magnetic powder after hydrogen decrepitation and powder jet milling and mixing, and gradually grow into rod-like Zr compounds existing in the R-rich intergranular phases during the sintering of a green compact. By adjusting the content of the element Zr, sintering temperature and time and other process parameters, the morphology, size and distribution of Zr compounds can be effectively controlled, and the mechanical properties of the magnet can be improved by strengthening (Continued)

the R-rich intergranular phases without deteriorating the magnetic properties of the magnet.

10 Claims, 2 Drawing Sheets

(51) Int. Cl.
| | | |
|---|---|---|
| *B22F 3/24* | (2006.01) | |
| *B22F 9/02* | (2006.01) | |
| *B22F 9/04* | (2006.01) | |
| *C22C 38/00* | (2006.01) | |
| *C22C 38/06* | (2006.01) | |
| *C22C 38/10* | (2006.01) | |
| *C22C 38/14* | (2006.01) | |
| *C22C 38/16* | (2006.01) | |
| *H01F 41/02* | (2006.01) | |

(52) U.S. Cl.
CPC .......... *C22C 38/004* (2013.01); *C22C 38/005* (2013.01); *C22C 38/06* (2013.01); *C22C 38/10* (2013.01); *C22C 38/14* (2013.01); *C22C 38/16* (2013.01); *H01F 41/0266* (2013.01); *B22F 2003/248* (2013.01); *B22F 2009/044* (2013.01); *B22F 2201/11* (2013.01); *B22F 2201/20* (2013.01); *B22F 2202/05* (2013.01); *B22F 2301/355* (2013.01); *B22F 2304/10* (2013.01); *B22F 2998/10* (2013.01); *C22C 2202/02* (2013.01)

HIGH-STRENGTH R-T-B RARE EARTH PERMANENT MAGNET AND PREPARATION METHOD THEREOF

This is a U.S. national stage application of PCT Application No. PCT/CN2021/140334 under 35 U.S.C. 371, filed Dec. 22, 2021 in Chinese, claiming priority of Chinese Application No. 202111161462.8, filed Sep. 30, 2021, all of which are hereby incorporated by reference.

TECHNICAL FIELD OF THE INVENTION

The present invention discloses a high-strength R-T-B rare earth permanent magnet, belonging to the field of rare earth magnets.

BACKGROUND OF THE INVENTION

As a functional material, R-T-B rare earth permanent magnets have been studied mainly on how to further improve their magnetic properties. In recent years, with increasing application of R-T-B magnets, especially with the development of high-speed motors and application of such magnets in the field of electric vehicles, the requirements for their mechanical properties are increasingly high.

The R-T-B rare earth permanent magnet is a brittle material prone to brittle fracture when stressed, which largely restricts its application scenarios. The main reasons for poor mechanical properties of R-T-B rare earth permanent magnets are as follows. First, the main phase of the magnet is an intermetallic compound which is complex in structure and does not allow slip or twinning deformation, making the magnet prone to brittle fracture when stressed. Second, the R-rich intergranular phases are relatively low in strength and poor in crack propagation resistance, resulting in crack easily propagating along the R-rich intergranular phases. Finally, the R-T-B magnets are featured with inhomogeneous micro-structures, and the non-uniform SMD of the main phase grains and the non-uniform distribution of the R-rich intergranular phases will easily lead to stress concentration.

The mechanical properties of the magnets can be improved to some extent by refining the main phase grains. However, the magnetic properties of the magnets will be affected in the process of refining the main phase grains, so it is difficult to operate in practical production. In addition, related studies show that the fracture type of magnets is dominated by intergranular fracture, i.e., the poor mechanical properties of the magnets are mainly because of the brittle R-rich intergranular phases. The low strength of the R-rich intergranular phases cannot be changed essentially by refining the main phase grains, so improving the strength of the R-rich intergranular phases is the key to improving the mechanical properties of the magnets at present.

The second phase strengthening is a common method to improve the mechanical properties of materials, and has been applied to various material systems. Therefore, it is expected to prepare a high-strength R-T-B rare earth permanent magnet through second-phase strengthening of the R-rich intergranular phases.

SUMMARY OF THE INVENTION

In view of the poor mechanical properties of R-T-B magnets, the present invention provides a high-strength R-T-B rare earth permanent magnet. The magnet is prepared by adding a certain amount of an element Zr in the process of proportioning raw materials, reasonably adjusting a ratio of Zr to B and T, then going through standard processes such as preparation of a cast strip, high-temperature treatment of the cast strip, hydrogen decrepitation, jet milling, jet milling for powder particle size distribution optimization, orienting compression, isostatic pressing, vacuum sintering and aging treatment. In the melting process, the cast strip is prepared by melting at 1480-1510° C. and pouring at 1440-1460° C., and then treated in argon gas at a high temperature of 900-1030° C. and a pressure of 30-50 kPa for 30 minutes to 4 hours. The element Zr in the cast strip will be precipitated in a form of fibrous Zr compounds out of R-rich phases after high-temperature treatment, and the fibrous Zr compounds can be uniformly mixed with magnetic powder after hydrogen decrepitation, powder jet milling and mixing. In addition, induced by high-temperature treatment to the cast strip, the precipitation of Zr compounds from the cast strip can avoid the precipitation of Zr compounds from the main phase grains during sintering. Then, the fibrous Zr compounds gradually grow into rod-like Zr compounds existing in the R-rich intergranular phases during the sintering of a green compact. By adjusting the content of the element Zr, sintering temperature and time and other process parameters, the morphology, size and distribution of Zr compounds can be effectively controlled, and the mechanical properties of the magnet can be improved by strengthening the R-rich intergranular phases. In addition, in the process of jet milling, the powder is further classified into powder with specific particle sizes by a powder classification device, preferably the powder containing more than 95% of powder particles with a surface mean diameter (SMD) of 3.0-6.0 μm, thus the homogeneity of a micro-structure of the magnet is improved by optimizing the powder particle size distribution, which can further improve the mechanical properties of the magnet. Compared with the conventional binary alloy sintering method adding second-phase particles, the second-phase precipitation method adopted in the present invention can obtain finer second-phase particles, i.e. adjusting the content of the element Zr in the magnet and sintering process parameters to control the morphology, size and distribution of Zr compounds, can avoid the defect that impurities are easily introduced in the conventional binary alloy sintering.

A technical solution employed in the present invention is as follows.

A high-strength R-T-B rare earth permanent magnet is provided, comprising following components:

29.0-33.0 wt. % of R, wherein R is composed of $R_1$, $R_2$ and $R_H$, $R_1$ is a rare earth element Nd, $R_2$ is a rare earth element Pr, and $R_H$ is at least one of rare earth elements Dy, Tb, Ho and Gd; the content of $R_2$ is between 0.3 wt. % and 10 wt. %, preferably between 0.5 wt. % and 2 wt. %; the content of $R_H$ is between 0.02 wt. % and 8.5 wt. %, preferably 0.1 wt. % and 1 wt. %; and the balance of R is $R_1$, 0.90-1.1 wt. % of B, 5.0 wt. % or less of M, wherein M is composed of $M_1$, $M_2$, $M_3$ and $M_4$, $M_1$ is an element Al, $M_2$ is an element Cu, $M_3$ is an element Ga, and $M_4$ is at least one of elements Si, Zn, Sn, Ge, Ag and Au; the content of $M_1$ is between 0.1 wt. % and 1.5 wt. %, preferably between 1 wt. % and 1.2 wt. %; the content of $M_2$ is between 0.01 wt. % and 0.55 wt. %, preferably between 0.1 wt. % and 0.3 wt. %; the content of $M_3$ is between 0.01 wt. % and 0.6 wt. %, preferably between 0.05 wt. % and 0.2 wt. %; when $M_4$ is included, the content of $M_4$ is less than or equal to 3.0 wt. %, 0.3-1.5 wt. % of Zr, preferably 0.5 wt. % to 1 wt. %, T and other unavoidable impurities as the balance, where T is at least one of Fe and Co, and more than 85 wt. % of T is Fe, the following formulas are met:

$$[Zr]/91.22 \geq 0.0025[T]/56 \quad (1),$$

$$[B]/10.81 \geq 4[Zr]/91.22 \quad (2),$$

wherein [Zr] is the content of Zr expressed by mass percent, [B] is the content of B expressed by mass percent, and [T] is the content of T expressed by mass percent; and when refractory metal elements such as Ti, Nb, Hf and W that can react with B to produce precipitates existing in the magnet, the total content of these elements should be lower than 0.01 wt. %, and the magnet is of a micro-structure consisting of main phase R2T14B, R-rich intergranular phases and rod-like Zr compounds, where the rod-like Zr compounds are mainly distributed in the R-rich intergranular phases of the magnet, and the number of the rod-like Zr compounds in the main phase grains accounts for less than 2.0% of the total number of the Zr compounds.

The rod-like Zr compounds have a length of 0.5-2.6 μm and an aspect ratio of 2 to 10.

The Zr compounds distributed in the micro-structure of the magnet have an area density of 1 to 6 Zr compounds per 100 μm², preferably 2 to 4 Zr compounds per 100 μm².

The high-strength R-T-B rare earth permanent magnet is prepared by following steps of: preparing a cast strip from proportioned raw materials of the high-strength R-T-B rare earth permanent magnet through vacuum induction melting and melt spinning, treating the cast strip at a high temperature to obtain a powder through hydrogen decrepitation and jet milling, compressing the powder in an oriented magnetic field after particle size distribution optimization, and preparing the molded magnet into the high-strength R-T-B rare earth permanent magnet through vacuum sintering and aging; and the cast strip is treated in argon gas at a high temperature of 900-1030° C. and a pressure of 30-50 kPa for 30 minutes to 4 hours.

The melting temperature for vacuum induction melting and melt spinning is 1480-1510° C., and the cast strip is prepared through melt spinning at 1440-1460° C.

During particle size distribution optimization, the powder after jet milling is classified by a powder classification device to obtain powder containing more than 95% of powder particles with a surface mean diameter (SMD) of 3.0-6.0 μm.

The vacuum sintering temperature is held at 1080-1120° C. for 4 hours to 20 hours.

The aging treatment process comprises a first aging stage in which the temperature is held at 700-900° C. for 2 hours to 8 hours and a second aging stage in which the temperature is held at 400-600° C. for 2 hours to 8 hours.

A preparation method of the high-strength R-T-B rare earth permanent magnet is further provided in the present invention, including following steps of: preparing a cast strip from proportioned raw materials of the high-strength R-T-B rare earth permanent magnet through vacuum induction melting and melt spinning, treating the cast strip at high temperature to obtain a powder through hydrogen decrepitation and jet milling, molding the powder in an oriented magnetic field after particle size distribution optimization, and preparing the molded magnet into the high-strength R-T-B rare earth permanent magnet through vacuum sintering and aging.

Further, during vacuum induction melting and melt spinning, the raw materials are melted into an alloy melt at 1480-1510° C., and the alloy melt is poured on a rotating copper roller at 1440-1460° C. by a tundish for solidification to obtain the cast strip.

The cast strip is treated in argon gas at a high temperature of 900-1030° C. and a pressure of 30-50 kPa for 30 minutes to 4 hours.

During particle size distribution optimization, the powder after jet milling is classified by a powder classification device to obtain powder containing more than 95% of powder particles with a surface mean diameter (SMD) of 3.0-6.0 μm.

The vacuum sintering temperature is held at 1080-1120° C. for 4 hours to 20 hours.

Further, the process of vacuum induction melting and melt spinning is preferably performed by following steps of: putting proportioned raw materials with a purity over 99.9% into a crucible in descending order of melting point, and vacuumizing till the vacuum degree reached $10^{-3}$ Pa to $10^{-4}$ Pa and the dew point is lower than −50° C.; filling argon gas in the furnace to make the gas pressure reach 30-50 kPa, heating the furnace to 1480-1510° C., holding the temperature for 3-5 minutes after the raw materials are completely melted; cooling the alloy melt down to 1440-1460° C., and pouring the alloy melt on a rotating copper roller by a tundish for solidification to obtain the cast strip. The process of preparing the cast strip through melt spinning is generally performed by following steps of: adjusting the speed of the copper roller to 70-75 rpm, and rotating the crucible at a certain speed, so that the alloy melt is conveyed to a cooling roller through the tundish for solidification, and cooled down after falling on a water-cooling tray to obtain the cast strip.

The process of treating the cast strip at a high temperature is performed by following steps of: putting the cast strip obtained by melting into a molybdenum boat and into a vacuum sintering furnace; vacuumizing till the vacuum degree in the furnace reached $10^{-3}$ Pa to $10^{-4}$ Pa and heating the furnace to 900-1030° C., filling argon gas at a pressure of 30-50 kPa in the furnace when the temperature reached a target temperature, and holding the temperature for 30 minutes to 4 hours; and cooling down to room temperature after heat treatment. This process has no requirement on cooling speed, so either furnace cooling or air cooling may be adopted.

The process of hydrogen decrepitation and jet milling is performed by following steps. The hydrogen pressure in a reaction kettle is generally 0.01-0.09 MPa during hydrogen decrepitation, and the hydrogen absorption process ends when the pressure change in the reaction kettle does not exceed 0.5% within 10 min in hydrogen abstraction reactions. After the hydrogen absorption reactions, the temperature is raised to 400-600° C. while vacuumizing, and held for 2 hours to 6 hours to release the hydrogen gas from the cast strip, and the cast strip is cooled down to obtain coarse powder through hydrogen decrepitation. The obtained coarse powder is put into a jet mill containing inert gas, and the pressure of a nozzle is adjusted to 0.6-0.8 MPa, and the coarse powder particles are crushed by colliding with each other under the action of the high-speed gas, and the inert gas is generally helium and nitrogen. A turbo selector and a cyclone separator of the jet mill are controlled to obtain powder of different particle sizes.

During particle size distribution optimization, the powder after jet milling is further classified by the powder classification device for particle size distribution optimization. The powder containing more than 95% of powder particles with a surface mean diameter (SMD) of 3.0-6.0 μm is preferred.

The powder may be added with lubricant and/or antioxidant before compression, and the conventional lubricant or antioxidant is available for the purpose of protecting magnetic powder. The dosage of the lubricant may be 0.01-0.1% by mass of the powder, and that of the antioxidant may be 0.01-0.14% by mass of the powder.

The compression of the powder in an oriented magnetic field is preferably performed by following steps. The oriented magnetic field is preferably 3-6 T and the molding pressure is 5-7 MPa, Cold isostatic pressing is performed on the green compact after orienting compression at a pressure of 150-180 MPa. The green compact density is 3.6-4.0 g/cm$^3$ after orienting compression and 4.5-4.6 g/cm$^3$ after cold isostatic pressing. Whether to perform cold isostatic pressing after compression depends on different processes, in the present invention, cold isostatic pressing is performed on the green compact after orienting compression, so as to further eliminate internal cracks of the green compact.

The vacuum sintering process is performed under a vacuum degree of $10^{-3}$ Pa to $10^{-4}$ Pa and at a temperature of 1080-1120° C., and the temperature is held for 4 hours to 20 hours. In order to avoid the rare earth elements on a surface layer of the magnet from volatilizing during high-temperature sintering, inert gas at a pressure of 30-50 kPa is filled into a sintering furnace after a target sintering temperature is reached, and the inert gas may be argon gas and helium gas.

The aging treatment process is that the sintered magnet is aged at 700-900° C. for 2 hours to 8 hours in a first aging stage, cooled down to below 100° C. at a speed of not less than 20° C./min, and aged for 2 hours to 8 hours in a second aging stage at 400-600° C., and finally cooled down to below 80° C. at a speed of not less than 30° C./min.

Whether the material is strengthened by second phase strengthen largely depends on the strength, morphology, size and distribution of the second phase. Adding second phase powder particles into the matrix powder is a common method in powder metallurgy industry, but it is difficult to ensure the homogeneous distribution of second phase by this method. In addition, the R-rich intergranular phases of R-T-B rare-earth permanent magnets have a high chemical activity and are easy to react with other elements. The method of adding the second phase can easily lead to the failure of complete reaction of the second phase or the formation of a high bonding interface between the matrix phases. This interface with high bonding strength cannot greatly improve the mechanical properties of the magnets, but will deteriorate the mechanical properties of the magnets in severe cases. At the same time, the magnetic properties of R-T-B magnets are sensitive to various impurities, and such trace impurities are easily introduced into magnets by mixing binary powders, which deteriorates the magnetic properties of the magnets. The above problems can be effectively avoided by using a strengthening second phase precipitation.

According to the present invention, a certain amount of the element Zr is added to the raw materials of the magnet during alloy melting, and the precipitation of Zr compounds will be inhibited due to a fast cooling speed when preparing the cast strip through vacuum induction melting and melt spinning. In the high-temperature treatment of the cast strip, the element Zr will be precipitated in a form of fibrous Zr compounds from R-rich phases, and the fibrous Zr compounds are uniformly mixed with the magnetic powder after hydrogen decrepitation and powder jet milling and mixing. The second phase precipitation method can avoid the introduction of external impurities, which can achieve better results than that achieved by mixing binary powders. The fibrous Zr compounds gradually grow into rod-like Zr compounds existing in the R-rich intergranular phases during sintering. By adjusting the content of the element Zr, sintering temperature and time and other process parameters, the morphology and size of the Zr compounds can be effectively controlled, and the mechanical properties of the magnet can be improved by strengthening the R-rich intergranular phases. At the same time, the particle size of the powder after jet milling is further optimized by the powder classification device, and the homogeneity of the microstructure of the magnet is improved by improving the uniform distribution of powder particle size, so as to improve the mechanical properties of the magnet.

The precipitation, morphology and distribution of the Zr compounds can be controlled by adjusting the content relationship between the elements Zr, B and T as well as controlling the dosage of the element Zr. Related studies show that the element Zr can replace part of the element R in the main phase R2T14B, so the low dosage of the element Zr will not allow the precipitation of Zr compounds. According to the present invention, a large number of experiments show that when the production of the main phase depends on the content of the element T, only when the content of the elements Zr and T conforms to Formula (1) can the Zr compounds be fully precipitated from the cast strip after high-temperature treatment. However, the higher content of the element Zr in the magnet is not always the better. With the increasing content of the element Zr in the magnet, the Zr compounds cannot be fully precipitated even after the high-temperature treatment of the cast strip. The remaining element Zr in the cast strip will be precipitated in a form of precipitates from the main phase grains during sintering. Due to the poor wettability between the main phase and the Zr compounds, an interface between the two will naturally initiate cracks, which deteriorates the mechanical and magnetic properties of the magnet. Given that the Formula (1) is met, the dosage of the element Zr is between 0.3 wt. % and 1.5 wt. % appropriately.

In addition, the element B is involved in the production of a variety of Zr compounds, so in order to ensure the full production of Zr compounds, the content of the elements B and Zr needs to conform to Formula (2). The elements such as Ti, Nb, Hf and W existing in the magnet will also react with the element B and consume part of the element B. Besides, experimental results show that it is hard to adjust the morphology, size and distribution of reaction products between these elements and the element B by sintering, and the mechanical properties of the magnet are improved to a limited extent. Therefore, the preferred composition of the magnet in the present invention does not contain Ti, Nb, Hf, W and other elements, and the total content of these elements existing as inevitable impurities should be less than 0.01 wt. %.

The size of the second phase will also affect the second phase strengthening effect on the magnet. The small-sized second phase in the R-T-B magnet has weak ability to change the crack propagation direction, and cannot improve the mechanical properties significantly while too large size of the second phase will seriously hinder the distribution of R-rich intergranular phases and deteriorate the magnetic properties of the magnet. The Zr compounds precipitated from the cast strip after high-temperature treatment are fine fibrous and will gradually grow into rod-like compounds during the sintering process. Experiments show that the size of rod-like Zr compounds can be controlled by adjusting the sintering temperature, provided that the density of the sintered magnet is ensured to reach the standard and there is no significant change in the average grain size. According to the present invention, the rod-like Zr precipitates with a length of 0.5-2.6 μm and an aspect ratio of 2 to 10 existing in the intergranular phases can effectively improve the mechanical properties of the magnet.

The Zr compounds distributed in the R-rich intergranular phases of the magnet will hinder the flow of the R-rich intergranular phases during secondary aging, resulting in the deteriorated distribution homogeneity of the R-rich intergranular phases and the low coercivity of the magnet. Experiments show that the melting point of the R-rich intergranular phases can be significantly lowered by using a certain amount of the element Pr instead of Nd and adding Al, Cu, Ga and other elements, by this means, the wettability between the R-rich intergranular phases and the main phase grains and the homogenous distribution of the R-rich intergranular phases can also be improved, thus improving the coercivity of the magnet.

Preferably, in the present invention, the powder after jet milling is classified by the powder classification device to obtain powder particles with more uniform size distribution, and the mechanical properties of the magnet are improved by controlling the homogeneity of the micro-structure of the magnet. The inhomogeneity of the micro-structure of the magnet, especially the non-uniform size distribution of the main phase grains, is one of the main reasons for the poor mechanical properties of the R-T-B magnet. Ultrafine particles in the powder will lead to the abnormal growth of surrounding grains during sintering, which will make the micro-structure even more inhomogeneous. When the ultra-fine particles in the magnet are melted or merged causing abnormal grain growth, fine precipitates are easily encapsulated in the main phase grains, which deteriorates the mechanical properties of the magnet. Therefore, the jet-milled powder is further classified to remove ultra-fine and coarse powder particles, which can effectively improve the uniform size distribution of the main phase grains, and enhance the strengthening effect of the Zr compounds on the mechanical properties of the magnet.

The advantage of the present invention lies in that the element Zr in the cast strip will be precipitated in a form of fibrous Zr compounds from R-rich phases after high-temperature treatment, and the fibrous Zr compounds can be uniformly mixed particle with magnetic powder after hydrogen decrepitation and powder jet milling and mixing. Then, the fibrous Zr compounds gradually grow into rod-like Zr compounds existing in the R-rich intergranular phases during the sintering of the green compact. The mechanical properties of the magnet are improved by strengthening the R-rich intergranular phases. According to the present invention, the rod-like Zr precipitates with a length of 0.5-2.6 μm and an aspect ratio of 2 to 10 existing in the intergranular phases can effectively improve the mechanical properties of the magnet. By optimizing the particle size distribution of the jet-milled powder and improving the homogeneity of the micro-structure of the magnet, the high-strength R-T-B magnet can be prepared without deteriorating coercivity and other magnetic properties of the magnet.

BRIEF DESCRIPTION OF THE DRAWINGS

FIGS. 1(a) and (b) are micro-structures of magnets in Experiment No. 5 and Experiment No. 8, respectively;
FIGS. 2(a) and (b) are micro-structures of the magnets in Experiment No. 21 and Experiment No. 23, respectively;
FIGS. 4(a) and (b) are micro-structures of cast strips in Experiment No. 30 and Experiment No. 31, respectively.

DETAILED DESCRIPTION OF THE EMBODIMENTS OF THE INVENTION

A technical solution of the present invention will be further described with reference to embodiments, but the scope of protection of the present invention is not limited thereto.

According to the present invention, during vacuum induction melting and melt spinning, proportioned raw materials with a purity over 99.9% were put into a crucible in descending order of melting point, and the vacuum degree in a furnace reached $10^{-3}$ Pa to $10^{-4}$ Pa and the dew point was lower than −50° C. after vacuumizing. Argon gas was filled into a furnace to make the gas pressure reach 30-50 kPa, the furnace was heated to 1480-1510° C., and the temperature was held for 3-5 minutes after the raw materials were completely melted. The temperature of an alloy melt obtained was reduced to 1440-1460° C. and held for pouring. The speed of a copper roller was adjusted to 70-75 rpm, and the crucible rotated at a certain speed, so that the alloy melt was conveyed to a cooling roller through a tundish for solidification, and cooled down after falling on a water-cooling tray.

A cast strip prepared by melting was treated at high temperature, and was put in a molybdenum boat and then in the vacuum sintering furnace. The furnace was heated to 900-1030° C. after the vacuum degree therein reached $10^{-3}$ Pa to $10^{-4}$ Pa. Argon gas at a pressure of 30-50 kPa was filled in the furnace when the temperature reached a target temperature and was held for 30 minutes to 4 hours. The furnace was cooled down to room temperature after heat treatment. This process had no requirement on cooling speed, so either furnace cooling or air cooling might be adopted.

The alloy sheet was prepared into a powder through hydrogen decrepitation and jet milling. The hydrogen pressure in a reaction kettle was generally 0.01-0.09 MPa during hydrogen decrepitation, and the hydrogen absorption process ended when the pressure change in the reaction kettle did not exceed 0.5% within 10 minutes in hydrogen abstraction reactions. After the hydrogen absorption reactions, the temperature was raised to 400-600° C. while vacuumizing and held for 2 hours to 6 hours to release the hydrogen gas from the cast strip, and the cast strip was cooled down to obtain coarse powder through hydrogen decrepitation. The obtained coarse powder was put into a jet mill, and the pressure of a nozzle was adjusted to 0.6-0.8 MPa, and the coarse powder particles were crushed by colliding with each other under the action of the high-speed gas, and the inert gas was generally helium and nitrogen. A turbo selector and a cyclone separator of the jet mill were controlled to obtain powder of different particle sizes.

The powder after jet milling was further classified by a powder classification device for particle size distribution optimization. The powder containing more than 95% of powder particles with a surface mean diameter (SMD) of 3.0-6.0 μm was preferred.

The powder might be added with lubricant and/or antioxidant before compression in an orientated magnetic field, and the conventional lubricant or antioxidant was available for the purpose of protecting magnetic powder. The dosage of the lubricant might be 0.01-0.1% by mass of the powder, and that of the antioxidant might be 0.01-0.14% by mass of the powder.

The orientation magnetic field was preferably 3-6 T, and the compressing pressure was 5-7 MPa. Cold isostatic pressing was performed on a green compact after orienting compression at a pressure of 150-180 MPa. The green compact density was 3.6-4.0 g/cm$^3$ after orientated compressing and 4.6 g/cm$^3$ after cold isostatic pressing.

Each magnet was densified by vacuum sintering. The vacuum sintering process was performed under a vacuum degree of $10^{-3}$ Pa to $10^{-4}$ Pa and at a temperature of 1080-1120° C. for 4 hours to 20 hours. In order to avoid the rare earth elements on a surface layer of the magnet from volatilizing during high-temperature sintering, inert gas at a pressure of 30-50 kPa was filled into a sintering furnace after a target sintering temperature was reached, and the inert gas might be argon gas and helium gas.

The sintered magnet needed to go through two aging stages, i.e., the sintered magnet was aged at 700-900° C. for 2 hours to 8 hours in a first aging stage, cooled down to below 100° C. at a speed of not less than 20° C./min, then aged for 2 hours to 8 hours in a second aging stage at 400-600° C., and finally cooled down to below 80° C. at a speed of not less than 30° C./min.

The magnets were crushed and sampled at the center to detect the composition thereof by ICP-MS. The microstructures of the magnets were observed by Scanning Electron Microscopy (SEM), and the micro-area composition of the magnets was analyzed by Electron Probe Micro-Analysis (EPMA). Three-point bending specimens with dimensions of 25(±0.01) mm×6(±0.01) mm×5(±0.01 mm) were fabricated by an inside diameter slicer and a double-sided grinding machine, with the height direction thereof parallel to the orientation direction of the magnets. According to GB/T31967.2-2015, the bending strength of the magnets shall be measured by a three-point bending method. In each experimental group, 10 specimens were measured to take the average value through calculation. The three-point bending indenter was a cylinder with a diameter of 5 mm and a down speed of 0.1 mm/min, and two support columns had a diameter of 5 mm and a spacing of 14.5 mm. Specimens with dimensions of φ10 mm×10 mm for magnetic property measurement were prepared by wire-electrode cutting, double-sided grinding and face grinding, and the magnetic properties of the magnets were measured by NIM equipment.

Embodiment One

When taking low melting point metals as raw materials, metals with purity of more than 99.9 wt. % should be adopted, and when taking elements with a melting point higher than pure iron as raw materials, an alloy of these elements and iron should be adopted. The raw materials were put in a crucible in descending order of melting point, and the vacuum degree in a furnace reached $10^{-4}$ Pa and the dew point was lower than −50° C. after vacuumizing. Argon gas was filled into the furnace to make the gas pressure reach 30 kPa, the furnace was heated to 1490° C., and the temperature was held for 3 minutes after the raw materials were completely melted. An alloy melt obtained was cooled down to 1450° C. for pouring. The speed of a copper roller was adjusted to 70 rpm, and the crucible rotated at a certain speed, so that the alloy melt was conveyed to a cooling roller through a tundish for solidification, and cooled down after falling on a water-cooling tray, to obtain a cast strip with a thickness of 0.25±0.05 mm.

The cast strip prepared by melting was treated at a high temperature, and was put in a molybdenum boat and then in the heating furnace. The furnace was heated to 1000° C. after the vacuum degree therein reached $10^{-4}$ Pa. Argon gas at a pressure of 30 kPa was filled in the furnace when the temperature reached a target temperature and was held for 2 hours. The furnace was cooled down to room temperature after heat treatment.

The alloy sheet was subjected to hydrogen absorption reactions at a hydrogen pressure of 0.09 MPa. After the hydrogen absorption reactions, the temperature was raised to 550° C. while vacuumizing and held for 4 hours to release the hydrogen gas from the cast strip, and the cast strip was cooled down to obtain coarse powder through hydrogen decrepitation. After cooling, 0.05 wt. % of zinc stearate was added to the coarse powder and mixed for 3 hours. The mixed coarse powder was further milled by jet milling with nitrogen gas to obtain fines, and the nitrogen pressure was 0.6 MPa. The fines after jet milling were further classified by a powder classification device, so that the fines contained more than 95% of powder particles with a surface mean diameter (SMD) of 3.0-6.0 μm.

Then, 0.03 wt. % of organic lubricant (magnetic powder lubricant 3# produced by Tianjin Yuesheng New Materials Research Institute) was added to the fines and mixed for 3 hours. The uniformly mixed fines were compressed in an oriented magnetic field which was a 3.5 T static magnetic field at a pressing pressure of 5 MPa, and the density of the pressed magnet was 3.9-4.0 g/cm$^3$. Cold isostatic pressing was performed at a pressure of 160 MPa, and the density of the pressed magnet was greater than 4.6 g/cm$^3$.

Each magnet was densified by vacuum sintering. The vacuum sintering process was that the magnet was sintered at a vacuum degree of $10^{-4}$ Pa and a temperature of 1080-1120° C. to ensure that the density of the sintered magnet was at least 7.53 g/cm$^3$, and the temperature was held for 4 hours to 20 hours. In order to avoid the rare earth elements on a surface layer of the magnet from volatilizing during high-temperature sintering, argon gas at 30 kPa was filled into a sintering furnace after a target sintering temperature was reached.

The sintered magnet needed to go through two aging stages, i.e., the sintered magnet was aged at 860° C. for 3 hours in a first aging stage, cooled down to below 100° C. at a speed of not less than 20° C./min, aged for 3 hours in a second aging stage at 520° C., and finally cooled down to below 80° C. at a speed of not less than 30° C./min.

The magnets were crushed and sampled at the center to detect the composition thereof by ICP-MS. The microstructures of the magnets were observed by Scanning Electron Microscopy (SEM), and the micro-area composition of the magnets was analyzed by Electron Probe Micro-Analysis (EPMA). According to GB/T31967.2-2015, the bending strength of the magnets shall be measured by a three-point bending method. In each experimental group, 10 specimens were measured to take the average value through calculation.

The composition of the magnets in each experimental group was expressed by mass percent, as shown in Table 1.

TABLE 1

| No. | Nd | Pr | Fe | Al | Dy | Co | Cu | Ga | B | Zr | Ti | Nb | Formula (1) | Formula (2) |
|---|---|---|---|---|---|---|---|---|---|---|---|---|---|---|
| 1 | 30.6 | 0.5 | Bal | 1 | 0.5 | 0.1 | 0.15 | 0.1 | 0.96 | 0 | / | / | / | / |
| 2 | 30.6 | 0.5 | Bal | 1 | 0.5 | 0.1 | 0.15 | 0.1 | 0.96 | 0.05 | / | / | Non-conforming | Conforming |
| 3 | 30.6 | 0.5 | Bal | 1 | 0.5 | 0.1 | 0.15 | 0.1 | 0.96 | 0.1 | / | / | Non-conforming | Conforming |
| 4 | 30.6 | 0.5 | Bal | 1 | 0.5 | 0.1 | 0.15 | 0.1 | 0.96 | 0.28 | / | / | Conforming | Conforming |
| 5 | 30.6 | 0.5 | Bal | 1 | 0.5 | 0.1 | 0.15 | 0.1 | 0.96 | 0.30 | / | / | Conforming | Conforming |
| 6 | 30.6 | 0.5 | Bal | 1 | 0.5 | 0.1 | 0.15 | 0.1 | 0.96 | 0.5 | / | / | Conforming | Conforming |
| 7 | 30.6 | 0.5 | Bal | 1 | 0.5 | 0.1 | 0.15 | 0.1 | 0.96 | 0.6 | / | / | Conforming | Conforming |
| 8 | 30.6 | 0.5 | Bal | 1 | 0.5 | 0.1 | 0.15 | 0.1 | 0.96 | 1 | / | / | Conforming | Conforming |
| 9 | 30.6 | 0.5 | Bal | 1 | 0.5 | 0.1 | 0.15 | 0.1 | 0.96 | 1.5 | / | / | Conforming | Conforming |
| 10 | 30.6 | 0.5 | Bal | 1 | 0.5 | 0.1 | 0.15 | 0.1 | 0.96 | 2 | / | / | Conforming | Conforming |
| 11 | 30.6 | 0.5 | Bal | 1 | 0.5 | 0.1 | 0.15 | 0.1 | 0.96 | 2.5 | / | / | Conforming | Non-conforming |
| 12 | 30.6 | 0.5 | Bal | 1 | 0.5 | 0.1 | 0.15 | 0.1 | 0.96 | 3 | / | / | Conforming | Non-conforming |
| 13 | 30.6 | 0.5 | Bal | 1 | 0.5 | 0.1 | 0.15 | 0.1 | 0.96 | 0.5 | 0.002 | / | Conforming | Conforming |
| 14 | 30.6 | 0.5 | Bal | 1 | 0.5 | 0.1 | 0.15 | 0.1 | 0.96 | 0.5 | 0.2 | / | Conforming | Conforming |
| 15 | 30.6 | 0.5 | Bal | 1 | 0.5 | 0.1 | 0.15 | 0.1 | 0.96 | 0.5 | 0.5 | / | Conforming | Conforming |
| 16 | 30.6 | 0.5 | Bal | 1 | 0.5 | 0.1 | 0.15 | 0.1 | 0.96 | 0.5 | / | 0.002 | Conforming | Conforming |
| 17 | 30.6 | 0.5 | Bal | 1 | 0.5 | 0.1 | 0.15 | 0.1 | 0.96 | 0.5 | / | 0.2 | Conforming | Conforming |
| 18 | 30.6 | 0.5 | Bal | 1 | 0.5 | 0.1 | 0.15 | 0.1 | 0.96 | 0.5 | / | 0.5 | Conforming | Conforming |
| 19 | 30.6 | 0.5 | Bal | 1 | 0.5 | 0.1 | 0.15 | 0.1 | 0.96 | 0.5 | 0.2 | 0.2 | Conforming | Conforming |

The bending strength of the magnets should be measured by a three-point bending method. In each experimental group, 10 specimens were measured to take the average value through calculation. In the back-scattering pattern of SEM, the size, the morphology, and the calculated proportion of precipitates in the R-rich intergranular phases and the calculated distribution density of precipitates (the quantity of precipitates in an area of 100 μm$^2$) in an area of 1000 μm×1000 μm were shown in Table 2 below.

TABLE 2

| No. | Bending strength/ MPa | Average length of precipitates (μm) | Proportion of precipitates in R-rich intergranular phases (%) | Distribution density (Number/ 100 μm$^2$) | Morphology of Zr compounds |
|---|---|---|---|---|---|
| 1 | 360 | / | / | / | / |
| 2 | 365 | / | / | / | / |
| 3 | 380 | / | / | / | / |
| 4 | 410 | 0.21 | 100 | 0.3 | Rod-like |
| 5 | 525 | 0.51 | 100 | 2 | Rod-like |
| 6 | 580 | 0.85 | 100 | 4 | Rod-like |
| 7 | 620 | 0.93 | 99.8 | 4 | Rod-like |
| 8 | 550 | 1.8 | 99.6 | 5 | Rod-like |
| 9 | 465 | 2.53 | 99.2 | 6 | Rod-like |
| 10 | 355 | 2.64 | 94.6 | 8 | Rod-like |
| 11 | 320 | 1.56 | 92.1 | 9 | Blocky |
| 12 | 280 | 1.83 | 88.4 | 9 | Blocky |
| 13 | 560 | 0.79 | 100 | 4 | Rod-like |
| 14 | 500 | 0.63 | 98.6 | 3 | Rod-like |
| 15 | 480 | 0.59 | 96.7 | 3 | Blocky |
| 16 | 565 | 0.82 | 100 | 4 | Rod-like |
| 17 | 515 | 0.61 | 98.8 | 4 | Rod-like |
| 18 | 465 | 0.6 | 97.5 | 2 | Blocky |
| 19 | 420 | 0.74 | 96.9 | 2 | Blocky |

Figure 1:
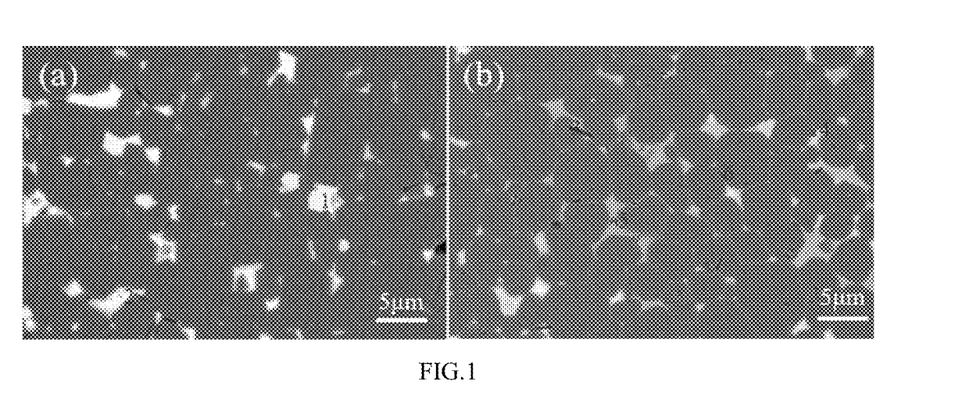

Microstructures of the magnets were observed by SEM, as shown in FIGS. 1(a) and 1(b). The figures showed that Zr compounds could be found in the intergranular phases of the magnet when the content of the element Zr in the magnet was 0.3 wt. %. However, due to the low dosage of the element Zr, there was less quantity of Zr compounds in the magnet. On the contrary, when the content of the element Zr in the magnet increased to 1.0 wt. %, the number of Zr compounds in the R-rich intergranular phases obviously increased.

The micro-area composition of the magnets was analyzed by EPMA spot scanning. The composition of precipitates from the magnet in Experiment No. 5 and experiment No. 8 was shown in Table 3.

TABLE 3

| Experiment No. | Scanning spot | Nd | Pr | Fe | Zr | B | Co | Al |
|---|---|---|---|---|---|---|---|---|
| 5 | 1 | 27.57 | 9.53 | 36.97 | 20.5 | 0.35 | 4.72 | 0.36 |
|   | 2 | 21.78 | 10.86 | 39.5 | 26.77 | 0.38 | / | 0.71 |
| 8 | 3 | 22 | 7.8 | 25.45 | 43.51 | 0.64 | / | 0.6 |
|   | 4 | 4.79 | 4.03 | 4.79 | 84.21 | 1.6 | / | 0.58 |
|   | 5 | 22.14 | 9.72 | 24.36 | 42.5 | 0.58 | / | 0.70 |
|   | 6 | 23.17 | 10.04 | 23.84 | 41.96 | 0.67 | / | 0.32 |

The composition of precipitates showed that the Zr compounds had a high content of the element Zr ranging from 20 wt. % to 85 wt. %. As the element Zr could replace the element R in the main phase, when the magnet contained a low concentration of the element Zr, the element Zr was not enough to involve in the precipitation, resulting in the failure to precipitate Zr compounds from the cast strip during high-temperature treatment. Therefore, in the present invention, only when the element Zr in the magnet exceeded a certain concentration could the precipitation of Zr compounds be obviously promoted.

Based on the data from each experimental group, it could be concluded that Zr compounds could be found in the magnet only when the content of the element Zr in the magnet conformed to Formula (1). When the content of the element Zr in the magnet conformed to the Formula (1) but was less than 0.3 wt. %, only a small amount of fine fibrous Zr compounds were precipitated. Due to the low distribution density and too small size of precipitates, these fine precipitates were easy to fracture along with the R-rich intergranular phases when the magnet was stressed, so the mechanical properties of the magnet were improved to a limited extent. The distribution density and average length of precipitates increased gradually when the content of the element Zr in the alloy increased to a value within a recommended range (0.3-1.5 wt. %), and the fibrous Zr compounds precipitated during the high-temperature treatment of the sintered cast strip grew into rod-like Zr compounds. Because the rod-like precipitates could withstand higher load, the intergranular phases of the magnets could be strengthened by changing the propagation direction of cracks. At the same time, the pulling effect of rod-like precipitates under stress might also consume more fracture energy, so the bending strength of the magnets could be effectively improved by the two effects.

The content of the element B in the magnets also affected the precipitation of Zr compounds. As shown in Experiment No. 11 and Experiment No. 12, when the content of the element B did not conform to the Formula (2), the Zr compounds precipitated out of the cast strip after high-temperature treatment were blocky compounds that would grow into blocky coarse precipitates after sintering. These blocky coarse precipitates contained more than 85 wt. % of the element Zr generally distributed in the R-rich intergranular phases and in direct contact with the main phase grains. Due to the poor wettability between the coarse precipitates and the main phase grains, the poor interface bonding strength between the coarse precipitates and the main phase grains easily led to stress concentration and deteriorated the mechanical properties of the magnets.

Ti, Nb and other elements that could react with the element with B to produce precipitates which would affect the precipitation of Zr compounds when existing in the magnets. Experiments No. 13 to No. 19 showed that when the content of Ti, Nb and other elements in the magnets increased, the average length of Zr compounds decreased and the bending strength deteriorated accordingly. The reaction of Ti, Nb and other elements with the element B affected the precipitation of Zr compounds during high temperature treatment and the further growth of Zr compounds during sintering, thus changing the size and precipitation of Zr compounds. The experimental results showed that the average length of Zr compounds in the magnets decreased with the addition of Ti and Nb, and the Zr compounds gradually changed from rod-like compounds to bulky compounds with the increase of Ti and Nb content. As a result, the strengthening effect of precipitates on the R-rich intergranular phases was weakened, and the bending strength of the magnets deteriorated. Therefore, when elements such as Ti, Nb, Hf and W existed as inevitable impurities, the total content of these elements should be less than 0.01 wt. %.

Embodiment Two

When taking low melting point metals as raw materials, metals with purity of more than 99.9 wt. % should be adopted, and when taking elements with a melting point higher than pure iron as raw materials, an alloy of these elements and iron should be adopted. The raw materials were put in a crucible in descending order of melting point, and the vacuum degree in a furnace reached $10^{-4}$ Pa and the dew point was lower than −50° C. after vacuumizing. Argon gas was filled into the furnace to make the gas pressure reach 30 kPa, the furnace was heated to 1490° C., and the temperature was held for 3 minutes after the raw materials were completely melted. An alloy melt obtained was cooled down to 1450° C. for pouring. The speed of a copper roller was adjusted to 70 rpm, and the crucible rotated at a certain speed, so that the alloy melt was conveyed to a cooling roller through a tundish for solidification, and cooled down after falling on a water-cooling tray, to obtain a cast strip with a thickness of 0.25±0.05 mm.

The cast strip prepared by melting was treated at a high temperature, and was put in a molybdenum boat and then in the heating furnace. The furnace was heated to 1000° C. after the vacuum degree therein reached $10^{-4}$ Pa. Argon gas at a pressure of 30 kPa was filled in the furnace when the temperature reached a target temperature and was held for 2 hours. The furnace was cooled down to room temperature after heat treatment.

The alloy sheet was subjected to hydrogen absorption reactions at a hydrogen pressure of 0.09 MPa. After the hydrogen absorption reactions, the temperature was raised to 550° C. while vacuumizing and held for 4 hours to release the hydrogen gas from the cast strip, and the cast strip was cooled down to obtain coarse powder through hydrogen decrepitation. After cooling, 0.05 wt. % of zinc stearate was added to the coarse powder and mixed for 3 hours. The mixed coarse powder was further milled by jet milling with nitrogen gas to obtain fines, and the nitrogen pressure was 0.6 MPa. The fines after jet milling were further classified by a powder classification device, so that the fines contained more than 95% of powder particles with a surface mean diameter (SMD) of 3.0-6.0 μm.

Then, 0.03 wt. % of organic lubricant (magnetic powder lubricant 3# produced by Tianjin Yuesheng New Materials Research Institute) was added to the fines and mixed for 3 hours. The uniformly mixed fines were compressed in an oriented magnetic field which was a 3.5 T static magnetic field at a pressing pressure of 5 MPa, and the density of the pressed magnet was 3.9-4.0 g/cm$^3$. Cold isostatic pressing was performed at a pressure of 160 MPa, and the density of the pressed magnet was greater than 4.6 g/cm$^3$.

Each magnet was densified by vacuum sintering. The vacuum sintering process was that the magnet was sintered at a vacuum degree of $10^{-4}$ Pa and a temperature of 1080-1120° C. to ensure that the density of the sintered magnet was at least 7.53 g/cm$^3$. The sintering process in different experimental groups was shown in Table 5. In order to avoid the rare earth elements on a surface layer of the magnets from volatilizing during high-temperature sintering, argon gas at 30 kPa was filled into a sintering furnace after a target sintering temperature was reached.

The sintered magnet needed to go through two aging stages, i.e., the sintered magnet was aged at 860° C. for 3 hours in a first aging stage, cooled down to below 100° C. at a speed of not less than 20° C./min, then aged for 3 hours in a second aging stage at 520° C., and finally cooled down to below 80° C. at a speed of not less than 30° C./min.

Micro-structures of the magnets were observed by Scanning Electron Microscopy (SEM), and the size and quantity of precipitates and the size of main phase grains were recorded in the back-scattering pattern of SEM. The magnets were crushed and sampled at the center to detect the composition thereof by ICP-MS. The composition of the magnets in each experimental group was expressed by mass fraction, as shown in Table 4.

Because the magnets in Experiment No. 20 to No. 23 contained a high concentration of the element Zr, it was difficult to densify the magnets by sintering at low temperature. The density of the specimens in Experiment No. 20 was still not up to standard after the temperature was held at 1060° C. for 12 hours, so the magnets in the present invention needed to be sintered at higher temperature.

It was found through analysis that the length of Zr compounds precipitated out of the cast strip during high-temperature treatment could be adjusted by changing the sintering temperature. In Experiments No. 20 to No. 23, the difference between average grain sizes of the magnets in different experimental groups did not exceed 0.5 μm at different sintering temperatures, provided that the density of

TABLE 4

| No. | Nd | Pr | Fe | Al | Dy | Co | Cu | Ga | B | Zr | Ti | Nb | Formula (1) | Formula (2) |
|---|---|---|---|---|---|---|---|---|---|---|---|---|---|---|
| 20~23 | 30.6 | 0.5 | Bal | 1 | 0.5 | 0.1 | 0.15 | 0.1 | 0.96 | 0.6 | / | / | Conforming | Conforming |
| 24 | 30.6 | 0.5 | Bal | 1 | 0.5 | 0.1 | 0.15 | 0.1 | 0.96 | / | 0.6 | / | / | / |
| 25 | 30.6 | 0.5 | Bal | 1 | 0.5 | 0.1 | 0.15 | 0.1 | 0.96 | / | / | 0.6 | / | / |
| 26 | 30.6 | 0.5 | Bal | 1 | 0.5 | 0.1 | 0.15 | 0.1 | 0.96 | / | 0.3 | 0.3 | / | / |
| 27 | 30.6 | 0.5 | Bal | 1 | 0.5 | 0.1 | 0.15 | 0.1 | 0.96 | / | 0.25 | / | / | / |

The sintering process in different experimental groups was shown in Table 5.

TABLE 5

| No. | Sintering temperature/° C. | Holding time/h |
|---|---|---|
| 20 | 1060 | 12 |
| 21 | 1080 | 7 |
| 22 | 1100 | 5 |
| 23 | 1130 | 4 |
| 24 | 1100 | 5 |
| 25 | 1100 | 5 |
| 26 | 1100 | 5 |
| 27 | 1100 | 5 |

Figure 2:
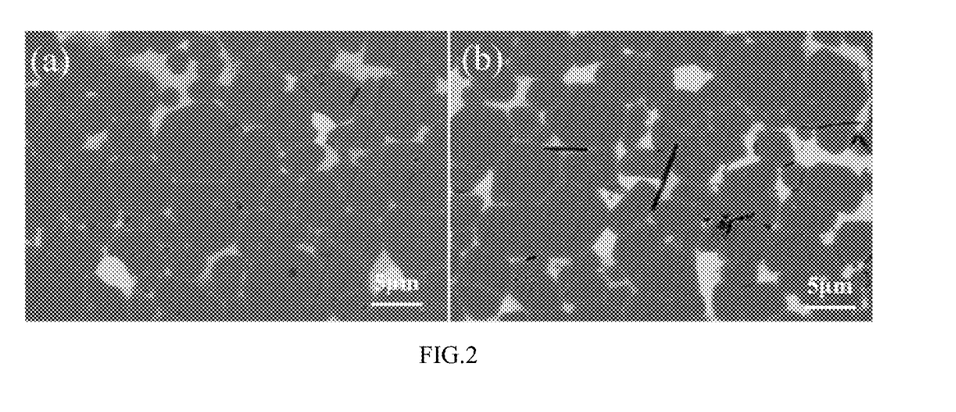

The bending strength of the magnets should be measured by a three-point bending method. In each experimental group, 10 specimens were measured to take the average value and the standard deviation through calculation. In the back-scattering pattern of SEM, the size and quantity of precipitates, and the calculated average length and aspect ratio of precipitates in an area of 1000 μm×1000 μm were specifically shown in Table 6 below.

the magnets was ensured to reach the standard. By analyzing the size of Zr compounds and mechanical properties of the magnets at different sintering temperatures, it was found that the length of Zr compounds in the magnets increased with the increase of sintering temperature. The micro-structure (shown in FIG. 2 (*b*)) in Experiment No. 23 (FIG. 2 (*b*)) showed that there were Zr compounds with a length of 6.14 μm when the sintering temperature was 1130° C. In this experimental group, the bending strength of the magnets first increased and then decreased with the increase of the length of Zr compounds, and reached its maximum when the average length of Zr compounds was 0.89 μm. The rod-like Zr compounds of appropriate sizes distributed in the intergranular phases could strengthen the R-rich intergranular phases and changed the propagation direction of cracks. At the same time, the pulling effect of rod-like precipitates under stress might absorb more fracture energy, so the mechanical properties of the magnets could be effectively improved. The Zr compounds of larger size in the magnets would be interspersed in and in direct contact with several main phase grains. Due to the poor wettability between Zr compounds and the main phase grains, the interface between

TABLE 6

| No. | Bending strength (MPa) | Standard deviation | Type | Morphology | Average length (μm) | Maximum length (μm) | Minimum length (μm) | Aspect ratio |
|---|---|---|---|---|---|---|---|---|
| 20 | 360 | 25.8 | Zr compounds | Rod-like | 0.42 | 1.26 | 0.1 | 2-4 |
| 21 | 585 | 15.6 | Zr compounds | Rod-like | 0.49 | 1.93 | 0.1 | 2-10 |
| 22 | 620 | 16.3 | Zr compounds | Rod-like | 0.89 | 2.33 | 0.32 | 2-10 |
| 23 | 490 | 32.8 | Zr compounds | Rod-like | 1.68 | 6.14 | 0.44 | 3-15 |
| 24 | 470 | 65.2 | Ti compounds | Fibrous/rod-like/blocky | / | / | / | / |
| 25 | 455 | 68.7 | Nb compounds | Fibrous/rod-like/blocky | / | / | / | / |
| 26 | 480 | 55.4 | Ti/Nb compounds | Fibrous/rod-like/blocky | / | / | / | / |
| 27 | 425 | 63.5 | Ti compounds | Granular/fibrous | / | / | / | / | the two phases would initiate cracks, so too large size of the precipitated phase would deteriorate the mechanical properties of the magnets.

In this embodiment, the sintering time at different temperatures was controlled to avoid significant change in the grain sizes in each experimental group as well as the influence of the size of the main phase grains on the mechanical properties of the magnets, provided that the density of the magnets was ensured to reach the standard. The experiments showed that only the Zr compounds with a length of 0.5-2.6 μm and an aspect ratio of 2-10 could strengthen the mechanical properties of the magnets.

When added to magnets alone, elements such as Nb and Ti also reacted with the element with B to produce precipitates. However, the experiments showed that the morphology of compounds produced by reactions between elements such as Nb and Ti and the element Zr was more diverse, including fibrous, rod-like and blocky compounds. Even granular precipitates could be found in case of a low dosage of these elements. In addition, it was difficult to control the size of Nb and Ti precipitates and the proportion of precipitates difference in morphology by controlling the sintering process. Although these precipitates in the magnets could also strengthen the R-rich intergranular phases and improve the bending strength of the magnets to a certain extent. However, due to the deviations in morphology and size of different precipitates, the mechanical properties of different parts of the magnets differed sharply, indicating that the standard deviation of the bending strength of this type of magnets was significantly higher than that of magnets containing the element Zr alone. Therefore, in order to ensure the consistency of mechanical properties of the magnets, the proportion of these elements in the magnets was minimized, and the content of these elements was less than 0.01 wt. % when such elements existed as inevitable impurities.

Embodiment Three

When taking low melting point metals as raw materials, metals with purity of more than 99.9 wt. % should be adopted, and when taking elements with a melting point higher than pure iron as raw materials, an alloy of these elements and iron should be adopted. The raw materials were put in a crucible in descending order of melting point, and the vacuum degree in a furnace reached $10^{-4}$ Pa and the dew point was lower than −50° C. after vacuumizing. Argon gas was filled into the furnace to make the gas pressure reach 30 kPa, the furnace was heated to 1490° C., and the temperature was held for 3 minutes after the raw materials were completely melted. An alloy melt obtained was cooled down to 1450° C. for pouring. The speed of a copper roller was adjusted to 70 rpm, and the crucible rotated at a certain speed, so that the alloy melt was conveyed to a cooling roller through a tundish for solidification, and cooled down after falling on a water-cooling tray, to obtain a cast strip with a thickness of 0.25±0.05 mm.

The cast strip prepared by melting was treated at a high temperature, and was put in a molybdenum boat and then in the heating furnace. The furnace was heated to 1000° C. after the vacuum degree therein reached $10^{-4}$ Pa. Argon gas at a pressure of 30 kPa was filled in the furnace when the temperature reached a target temperature and was held for 2 hours. The furnace was cooled down to room temperature after heat treatment.

The alloy sheet was subjected to hydrogen absorption reactions at a hydrogen pressure of 0.09 MPa. After the hydrogen absorption reactions, the temperature was raised to 550° C. while vacuumizing and held for 4 hours to release the hydrogen gas from the cast strip, and the cast strip was cooled down to obtain coarse powder through hydrogen decrepitation. After cooling, 0.05 wt. % of zinc stearate was added to the coarse powder and mixed for 3 h. The mixed coarse powder was further milled by jet milling with nitrogen gas to obtain fines, and the nitrogen pressure was 0.6 Mpa. Some fines after jet milling were further classified by a powder classification device, so that the fines contained more than 95% of powder particles with a surface mean diameter (SMD) of 3.0-6.0 μm. The fines without being classified by the powder classification device contained 82% of powder particles with SMD of 3.0-6.0 μm.

Then, 0.03 wt. % of organic lubricant (magnetic powder lubricant 3# produced by Tianjin Yuesheng New Materials Research Institute) was added to the fines and mixed for 3 hours. The uniformly mixed fines were compressed in an oriented magnetic field which was a 3.5 T static magnetic field at a pressing pressure of 5 MPa, and the density of the pressed magnet was 3.9-4.0 g/cm³. Cold isostatic pressing was performed at a pressure of 160 MPa, and the density of the pressed magnet was greater than 4.6 g/cm³.

In this embodiment, the composition in all experimental groups was the same as that in Experiment No. 7, and the green compact was sintered in a vacuum sintering furnace for densification. The vacuum sintering process was performed at a vacuum degree of $10^{-4}$ Pa and a temperature of 1100° C. In order to avoid the rare earth elements on a surface layer of the magnet from volatilizing during high-temperature sintering, argon gas at 30 kPa was filled into a sintering furnace after a target sintering temperature was reached and held for 6 hours.

The sintered magnet needed to go through two aging stages, i.e., the sintered magnet was aged at 860° C. for 3 hours in a first aging stage, cooled down to below 100° C. at a speed of not less than 20° C./min, then aged for 3 hours in a second aging stage at 520° C., and finally cooled down to below 80° C. at a speed of not less than 30° C./min.

The bending strength of the sintered magnet was measured with a universal material tester by three-point bending tests. Microstructures of the magnets was observed by SEM, and the size and quantity of precipitates and the size of main phase grains in an area of 1000 μm×1000 μm were recorded in the back-scattering pattern of SEM.

The process characteristics, the size and distribution of precipitates, the size of main phase grains and the mechanical properties of the magnets in different experimental groups were shown in Table 7.

TABLE 7

| No. | Powder classification | Proportion of powder particles with SMD of 3.0-6.0 μm | Average grain size (μm) | Maximum grain size (μm) | Number of grains greater than 15 μm/Nr. | Bending strength (MPa) | Proportion of precipitates in intergranular phases |
|---|---|---|---|---|---|---|---|
| 28 | Yes | 95% | 8.2 | 17.9 | 23 | 615 | 99.8 |
| 29 | No | 82% | 12.3 | 25.6 | 325 | 530 | 96.7 |

Figure 3:
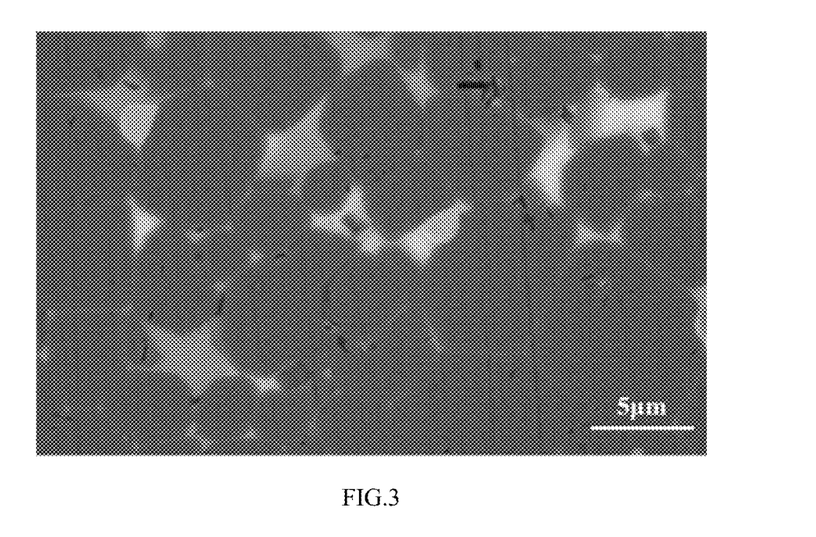
FIG. 3 is a micro-structure of magnets in Experiment No. 29.

Comparison of the above experimental data showed that the grain sizes in Experiment No. 28 were more uniform, indicating that the jet-milled powder after powder classification could significantly reduce the proportion of ultrafine and coarse powder particles, and improve the size consistency of grains in the sintered magnets, and obviously improve the mechanical properties of the magnets. In addition, the uniform particle size distribution could affect the distribution of precipitates. When ultrafine powder particles dominated in the powder particles were melted or merge with surrounding large grains during sintering, Zr compounds were easily encapsulated in the main phase grains during grain growth, as shown in the micro-structure of the magnets in FIG. 3. The distribution of precipitates showed that the proportion of precipitates in the intergranular phases without powder classification in the magnets significantly decreased, i.e., the number of precipitates distributed in the main phase grains increased. These precipitates existing in the main phase grains would initiate cracks in the main phase grains, thus deteriorating the mechanical properties of the magnets. The powder classification could ensure the consistency of the main phase grains in the magnets and also could prevent the ultrafine power particles from encapsulating precipitates during the growth of surrounding grains, so as to give full play to the advantages of precipitates in improving the mechanical properties of the magnets.

Embodiment Four

When taking low melting point metals as raw materials, metals with purity of more than 99.9 wt. % should be adopted, and when taking elements with a melting point higher than pure iron as raw materials, an alloy of these elements and iron should be adopted. The raw materials were put in a crucible in descending order of melting point, and the vacuum degree in a furnace reached $10^{-4}$ Pa and the dew point was lower than −50° C. after vacuumizing. Argon gas was filled into the furnace to make the gas pressure reach 30 kPa, the furnace was heated to 1490° C., and the temperature was held for 3 minutes after the raw materials were completely melted. An alloy melt obtained was cooled down to 1450° C. for pouring. The speed of a copper roller was adjusted to 70 rpm, and the crucible rotated at a certain speed, so that the alloy melt was conveyed to a cooling roller through a tundish for solidification, and cooled down after falling on a water-cooling tray, to obtain a cast strip with a thickness of 0.25±0.05 mm.

For comparison, some cast strips prepared by melting were treated at high temperature while some were not. The cast strips prepared by melting were put in a molybdenum boat and then in the heating furnace. The furnace was heated to 1000° C. after the vacuum degree therein reached $10^{-4}$ Pa. Argon gas at a pressure of 30 kPa was filled in the furnace when the temperature reached a target temperature and was held for 2 hours. The furnace was cooled down to room temperature after heat treatment.

Each alloy sheet was subjected to hydrogen absorption reactions at a hydrogen pressure of 0.09 MPa. After the hydrogen absorption reactions, the temperature was raised to 550° C. while vacuumizing and held for 4 hours to release the hydrogen gas from the cast strip, and the cast strip was cooled down to obtain coarse powder through hydrogen decrepitation. After cooling, 0.05 wt. % of zinc stearate was added to the coarse powder and mixed for 3 hours. The mixed coarse powder was further milled by jet milling with nitrogen gas to obtain fines, and the nitrogen pressure was 0.6 MPa. Some fines after jet milling were further classified by a powder classification device, so that the fines contained more than 95% of powder particles with a surface mean diameter (SMD) of 3.0-6.0 μm. The fines without being classified by the powder classification device contained 82% of powder particles with SMD of 3.0-6.0 μm.

Then, 0.03 wt. % of organic lubricant (magnetic powder lubricant 3# produced by Tianjin Yuesheng New Materials Research Institute) was added to the fines and mixed for 3 hours. The uniformly mixed fines were compressed in an oriented magnetic field which was a 3.5 T static magnetic field at a pressing pressure of 5 MPa, and the density of the pressed magnet was 3.9-4.0 g/cm³. Cold isostatic pressing was performed at a pressure of 160 MPa, and the density of the pressed magnet was greater than 4.6 g/cm³.

In this embodiment, the composition in all experimental groups was the same as that in Experiment No. 7, and the green compact was sintered in a vacuum sintering furnace for densification. The vacuum sintering process was performed at a vacuum degree of $10^{-4}$ Pa and a temperature of 1100° C. In order to avoid the rare earth elements on a surface layer of the magnet from volatilizing during high-temperature sintering, argon gas at 30 kPa was filled into a sintering furnace after a target sintering temperature was reached and held for 6 hours.

The sintered magnet needed to go through two aging stages, i.e., the sintered magnet was aged at 860° C. for 3 hours in a first aging stage, cooled down to below 100° C. at a speed of not less than 20° C./min, and aged for 3 hours in a second aging stage at 520° C., and finally cooled down to below 80° C. at a speed of not less than 30° C./min.

Figure 4:
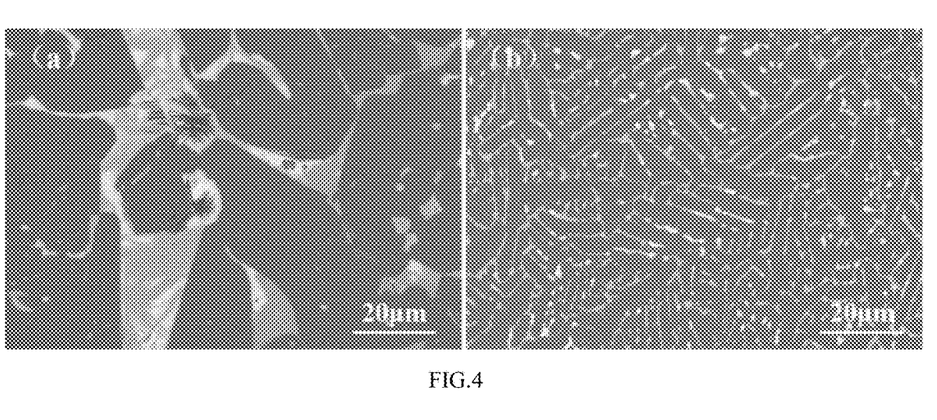

Micro-structures of the magnets were observed by SEM. FIGS. 4(a) and (b) showed the micro-structures of the cast strip after high-temperature treatment and without high-temperature treatment, respectively. The figures showed that no Zr compound could be found in the structure of the cast strips without high-temperature treatment, but clusters of fine fibrous Zr compounds could be found in the R-rich phase when the cast strip was treated for 2 hours at a high temperature of 1000° C. These Zr compounds were crushed and uniformly mixed with magnetic powder in the subsequent milling process, acting as a binary powder mixture.

The bending strength of the magnets should be measured by a three-point bending method. In each experimental group, 10 specimens were measured to take the average value through calculation. In the back-scattering pattern of SEM, the quantity and distribution of precipitates in an area of 1000 μm×1000 μm were specifically shown in Table 8 below.

TABLE 8

| Experiment No. | High-temperature treatment of the cast strip | Bending strength (MPa) | Proportion of precipitates distributed in main phase grains (%) |
|---|---|---|---|
| 30 | Yes | 615 | 0.25 |
| 31 | No | 480 | 9.5 |

Figure 5:
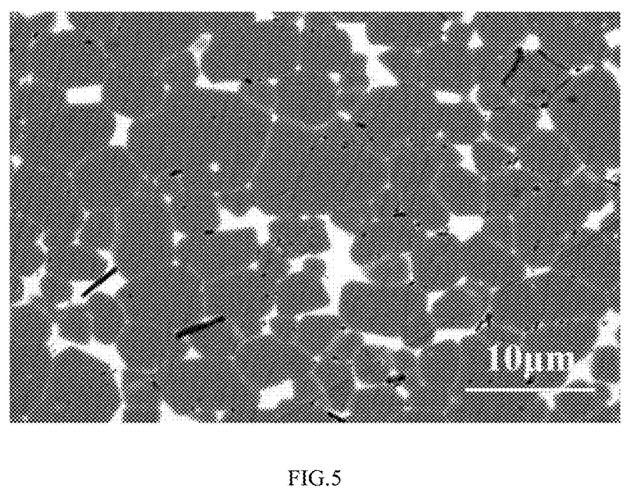
FIG. 5 is a micro-structure of magnets in Experiment No. 31.

FIG. 5 showed a micro-structure of the magnets in Experiment No. 31. Based on the data in Table 8, it could be found that the main phase Zr compounds in the magnets were distributed in intergranular phases after the high-temperature treatment of cast strips, while a considerable proportion of Zr compounds in the magnets were distributed in the main phase grains without the high-temperature treatment of cast strips. At the same time, the bending strength of the magnets in Experiment No. 30 was significantly higher than that of the magnets in Experiment No. 31.

The high-temperature treatment was performed on the cast strips of the magnets in Experiment No. 30 before hydrogen decrepitation, which promoted the precipitation of Zr compounds out of the cast strips. In the subsequent preparation of powders, these Zr compounds would be crushed to a certain extent and uniformly mixed with magnetic powder, acting as a binary powder mixture. However, the powders obtained by this method had the advantages of high morphological consistency, uniform particle size distribution and no impurities. In the subsequent sintering process, these Zr compounds grew from fibrous to rod-like compounds existing in the intergranular phases of the magnets. The mechanical properties of the magnets could be improved by strengthening the R-rich intergranular phases of the magnets.

Since no high-temperature treatment was performed on the cast strips of the magnets in Experiment No. 31, the Zr compounds could only be precipitated out of the magnets in the sintering process during which the precipitation of Zr compounds occurred simultaneously with the magnet densification and the main phase grain growth, and the Zr compounds precipitated in this process was easily encapsulated in the main phase grains. Therefore, the proportion of precipitates in the main phase grains in the magnets in Experiment No. 31 was much higher than that in Experiment No. 30. These precipitates existing in the main phase grains initiated cracks in the main phase grains, thus deteriorating the mechanical properties of the magnets.

Embodiment Five

When taking low melting point metals as raw materials, metals with purity of more than 99.9 wt. % should be adopted, and when taking elements with a melting point higher than pure iron as raw materials, an alloy of these elements and iron should be adopted. The raw materials were put in a crucible in descending order of melting point, and the vacuum degree in a furnace reached $10^{-4}$ Pa and the dew point was lower than −50° C. after vacuumizing. Argon gas was filled into the furnace to make the gas pressure reach 30 kPa, the furnace was heated to 1490° C., and the temperature was held for 3 minutes after the raw materials were completely melted. An alloy melt obtained was cooled down to 1450° C. for pouring. The speed of a copper roller was adjusted to 70 rpm, and the crucible rotated at a certain speed, so that the alloy melt was conveyed to a cooling roller through a tundish for solidification, and cooled down after falling on a water-cooling tray, to obtain a cast strip with a thickness of 0.25±0.05 mm.

The cast strip prepared by melting was treated at a high temperature, and was put in a molybdenum boat and then in the heating furnace. The furnace was heated to 1000° C. after the vacuum degree therein reached $10^{-4}$ Pa. Argon gas at a pressure of 30 kPa was filled in the furnace when the temperature reached a target temperature and was held for 2 hours. The furnace was cooled down to room temperature after heat treatment.

The alloy sheet was subjected to hydrogen absorption reactions at a hydrogen pressure of 0.09 MPa. After the hydrogen absorption reactions, the temperature was raised to 550° C. while vacuumizing and held for 4 hours to release the hydrogen gas from the cast strip, and the cast strip was cooled down to obtain coarse powder through hydrogen decrepitation. After cooling, 0.05 wt. % of zinc stearate was added to the coarse powder and mixed for 3 hours. The mixed coarse powder was further milled by jet milling with nitrogen gas to obtain fine particles, and the nitrogen pressure was 0.6 MPa. The fines after jet milling were further classified by a powder classification device, so that the fines contained more than 95% of powder particles with a surface mean diameter (SMD) of 3.0-6.0 μm.

Then, 0.03 wt. % of organic lubricant (magnetic powder lubricant 3# produced by Tianjin Yuesheng New Materials Research Institute) was added to the fines and mixed for 3 hours. The uniformly mixed fines were compressed in an oriented magnetic field which was a 3.5 T static magnetic field at a pressing pressure of 5 MPa, and the density of the pressed magnet was 3.9-4.0 g/cm³. Cold isostatic pressing was performed at a pressure of 160 MPa, and the density of the pressed magnet was greater than 4.6 g/cm³.

Each magnet was densified by vacuum sintering. The vacuum sintering process was performed at a vacuum degree of $10^{-4}$ Pa and a temperature of 1100° C. to ensure that the density of the sintered magnet was at least 7.53 g/cm³. In order to avoid the rare earth elements on a surface layer of the magnet from volatilizing during high-temperature sintering, argon gas at 30 kPa was filled into a sintering furnace after a target sintering temperature was reached and held for 6 h.

The sintered magnet needed to go through two aging stages, i.e., the sintered magnet was aged at 860° C. for 3 hours in a first aging stage, cooled down to below 100° C. at a speed of not less than 20° C./min, then aged for 3 hours in a second aging stage at 520° C., and finally cooled down to below 80° C. at a speed of not less than 30° C./min.

The magnets were crushed and sampled at the center to detect the composition thereof by ICP-MS. Three-point bending specimens were fabricated by an inside diameter slicer and a double-sided grinding machine. According to GB/T31967.2-2015, the bending strength of the magnets should be measured by a three-point bending method. In each experimental group, 10 specimens were measured to take the average value through calculation. Specimens with dimensions of ϕ10 mm×10 mm for magnetic property measurement were prepared by wire-electrode cutting, double-sided grinding and face grinding, and the magnetic properties of the magnets were measured by NIM equipment.

The composition of the magnets in each experimental group was expressed by mass fraction, as shown in Table 9.

TABLE 9

| No. | Nd | Pr | Fe | Al | Dy | Co | Cu | Ga | B | Zr |
|-----|------|-----|-----|----|-----|-----|------|-----|------|-----|
| 32 | 30.6 | 0.5 | Bal | 1 | 0.5 | 0.1 | 0.15 | 0.1 | 0.96 | / |
| 33 | 30.6 | 0.5 | Bal | 1 | 0.5 | 0.1 | 0.15 | 0.1 | 0.96 | 0.6 |
| 34 | 31.1 | / | Bal | 1 | 0.5 | 0.1 | 0.15 | 0.1 | 0.96 | 0.6 |
| 35 | 31.6 | 0.5 | Bal | / | 0.5 | 0.1 | 0.15 | 0.1 | 0.96 | 0.6 |
| 36 | 30.75 | 0.5 | Bal | 1 | 0.5 | 0.1 | / | 0.1 | 0.96 | 0.6 |
| 37 | 30.7 | 0.5 | Bal | 1 | 0.5 | 0.1 | 0.15 | / | 0.96 | 0.6 |

Mechanical properties and coercivity of the magnet were shown in Table 10.

TABLE 10

| No. | Bending strength (MPa) | Coercivity (kOe) |
|-----|------------------------|------------------|
| 32 | 360 | 20.13 |
| 33 | 618 | 20.09 |
| 34 | 602 | 19.65 |
| 35 | 613 | 18.24 |
| 36 | 596 | 19.80 |
| 37 | 620 | 19.74 |

In this embodiment, by adjusting the composition of the magnets, some elements in Pr, Al, Cu and Ga might be selectively removed, and the content of removed elements was replaced by the same weight percentage of an element Nd. The data such as magnet composition, mechanical properties and coercivity showed that the change in the content of elements such as Pr, Al, Cu and Ga would not affect the bending strength of the magnets containing 0.6 wt. % of the element Zr, but would affect the magnetic properties of the magnets to a great extent. If elements Al, Ga, Cu and Pr were added to magnets containing 0.6 wt. % of the element Zr, the coercivity of the magnets was basically the same as that of magnets without the element Zr. However, the absence of one of the four elements would lead to a great decrease in the coercivity of magnets. Therefore, these four elements must be added to improve the mechanical properties of the magnets by Zr compounds in this experiment to ensure that the coercivity of the magnets did not decrease.

In the present invention, rod-like Zr compounds were distributed in the R-rich intergranular phases, and the mechanical properties of the magnets were improved by strengthening the R-rich intergranular phases. However, the distribution of rod-like Zr compounds in intergranular phases would hinder the flow and distribution of intergranular phases during the second aging stage, thus deteriorating the coercivity of the magnets. References suggested that when the element Nd in R-T-B magnets was replaced with a certain amount of the element Pr, the element Pr was mainly distributed in the intergranular phases. The combined addition of low melting point elements Al, Cu and Ga significantly reduced the melting point of grain boundary phase and enhanced the wettability between the intergranular phases and the main phase grains, so as to improve the distribution of intergranular phases and the coercivity of magnets in the second aging stage.

The invention claimed is:

1. A high-strength R-T-B rare earth permanent magnet, comprising following components in weight percentage relative to total composition of the rare earth permanent magnet:
29.0-33.0 wt. % of R, wherein R is composed of $R_1$, $R_2$ and $R_H$, $R_1$ is a rare earth element Nd, $R_2$ is a rare earth element Pr, and $R_H$ is at least one of rare earth elements Dy, Tb, Ho and Gd; the content of $R_2$ is between 0.3 wt. % and 10 wt. %; the content of $R_H$ is between 0.02 wt. % and 8.5 wt. %; and the balance of R is $R_1$,
0.90-1.1 wt. % of B,
0.12 wt %-5.0 wt. % of M, wherein M is composed of $M_1$, $M_2$, $M_3$ and/or $M_4$, $M_1$ is an element Al, $M_2$ is an element Cu, $M_3$ is an element Ga, and $M_4$ is at least one of elements Si, Zn, Sn, Ge, Ag and Au; the content of $M_1$ is between 0.1 wt. % and 1.5 wt. %; the content of $M_2$ is between 0.01 wt. % and 0.55 wt. %; the content of $M_3$ is between 0.01 wt. % and 0.6 wt. %; when M contains $M_4$, the content of $M_4$ is less than or equal to 3.0 wt. %,
0.3-1.5 wt. % of Zr,
T and other unavoidable impurities as the balance, wherein T is at least one of Fe and Co, and more than 85 wt. % of T is Fe,
the following formulas are met:

$$[Zr]/91.22 \geq 0.0025[T]/56 \quad (1),$$

$$[B]/10.81 \geq 4[Zr]/91.22 \quad (2),$$

wherein [Zr] is the content of Zr expressed by mass percent, [B] is the content of B expressed by mass percent, and [T] is the content of T expressed by mass percent; and
the magnet is of a micro-structure consisting of main phase R2T14B, R-rich intergranular phases and rod-like Zr compounds, wherein the rod-like Zr compounds are mainly distributed in the R-rich intergranular phases of the magnet, and the number of the rod-like Zr compounds in the main phase grains accounts for less than 2.0% of a total number of the rod-like Zr compounds.

2. The high-strength R-T-B rare earth permanent magnet according to claim 1, wherein the high-strength R-T-B rare earth permanent magnet is prepared by following steps of: preparing an cast strip from proportioned raw materials of the high-strength R-T-B rare earth permanent magnet through vacuum induction melting and melt spinning, treating the cast strip at a high temperature to obtain a powder through hydrogen decrepitation and jet milling, molding the powder in an oriented magnetic field after particle size distribution optimization, and preparing a molded magnet into the high-strength R-T-B rare earth permanent magnet through vacuum sintering and aging treatment;
wherein treating the cast strip at the high temperature is treating the cast strip in argon gas at a temperature of 900-1030° C. and a pressure of 30-50 kPa for 30 minutes to 4 hours.

3. The high-strength R-T-B rare earth permanent magnet according to claim 2, wherein the melting temperature is 1480-1510° C., and the cast strip is prepared through melt spinning at 1440-1460° C.

4. The high-strength R-T-B rare earth permanent magnet according to claim 2, wherein, during particle size distribution optimization, the powder after jet milling is classified by a powder classification device to obtain powder containing more than 95% of powder particles with a surface mean diameter (SMD) of 3.0-6.0 μm.

5. The high-strength R-T-B rare earth permanent magnet according to claim 2, wherein the vacuum sintering temperature is held at 1080-1120° C. for 4 hours to 20 hours.

6. The high-strength R-T-B rare earth permanent magnet according to claim 2, wherein the aging process comprises a first aging stage in which the temperature is held at 700-900°° C. for 2 hours to 8 hours and a second aging stage in which the temperature is held at 400-600° C. for 2 hours to 8 hours.

7. The high-strength R-T-B rare earth permanent magnet according to claim 1, wherein the rod-like Zr compounds have a length of 0.5-2.6 μm and an aspect ratio of 2 to 10.

8. The high-strength R-T-B rare earth permanent magnet according to claim 1, wherein the rod-like Zr compounds distributed in the micro-structure of the magnet have an area density of 1 to 6 Zr compounds per 100 μm$^2$.

9. The high-strength R-T-B rare earth permanent magnet according to claim 1, wherein a total content of elements Ti, Nb, Hf and W in the magnet is lower than 0.01 wt. %.

10. A preparation method of the high-strength R-T-B rare earth permanent magnet according to claim 1, comprising following steps of: preparing a cast strip from proportioned raw materials of the high-strength R-T-B rare earth permanent magnet through vacuum induction melting and melt spinning, treating the cast strip at a high temperature to obtain a powder through hydrogen decrepitation and jet milling, compressing the powder in an oriented magnetic field after particle size distribution optimization, and preparing a molded magnet into the high-strength R-T-B rare earth permanent magnet through vacuum sintering and aging treatment; and during vacuum induction melting and melt spinning, the raw materials are melted into alloy melt at 1480-1510° C., and the alloy melt is poured on a rotating copper roller at 1440-1460° C. by a tundish for solidification to obtain the cast strip;

treating the cast strip in argon gas at a high temperature of 900-1030° C. and a pressure of 30-50 kPa for 30 minutes to 4 hours;

during particle size distribution optimization, the powder after jet milling is classified by a powder classification device to obtain powder containing more than 95% of powder particles with a surface mean diameter (SMD) of 3.0-6.0 μm; and the vacuum sintering temperature is held at 1080-1120° C. for 4 hours to 20 hours.

* * * * *